United States Patent
Thomine et al.

[11] Patent Number: 5,828,478
[45] Date of Patent: Oct. 27, 1998

[54] SYSTEM FOR TRANSMITTING RZ PULSES OVER AN AMPLIFIED OPTICAL LINE, IN PARTICULAR OVER LONG DISTANCES

[75] Inventors: Jean-Baptiste Thomine, Paris; Veluppillai Chandrakumar, Bagneux, both of France

[73] Assignee: France Telecom, Paris, France

[21] Appl. No.: 703,992

[22] Filed: Aug. 28, 1996

[30] Foreign Application Priority Data

Sep. 1, 1995 [FR] France .................................. 95 10294

[51] Int. Cl.$^6$ ............................. H04B 10/04; H04B 10/12
[52] U.S. Cl. ........................ 359/181; 359/160; 359/161; 359/183; 359/188
[58] Field of Search .................................. 359/160–161, 359/173, 176, 179, 181, 183, 188, 134

[56] References Cited

U.S. PATENT DOCUMENTS 5,373,382  12/1994  Pirio et al. .............................. 359/161
5,473,458  12/1995  Mamyshev et al. ..................... 359/161
5,477,375  12/1995  Korotky et al. ......................... 359/183
5,642,215  6/1997   Suzuki et al. ........................... 359/161

FOREIGN PATENT DOCUMENTS

A-0 555 063  2/1993  European Pat. Off. ........ H04B 10/18
A-0 626 768  5/1994  European Pat. Off. ........ H04B 10/18

*Primary Examiner*—Kinfe-Michael Negash
*Attorney, Agent, or Firm*—Blakely Sokoloff Taylor & Zafman

[57] ABSTRACT

A system for transmitting a return to zero type optical pulse stream includes an optical line and arrangements for amplifying and reshaping pulses distributed along the length of the line. The mean chromatic dispersion of the fiber of the line is of the normal type and the reshaping arrangements include a modulator that is synchronized to the pulse stream that it receives and that applies amplitude modulation to reshape the pulses temporally and phase modulation that is decreasing at the start of a pulse and increasing at the end of a pulse to reshape the pulses spectrally. The reshaping arrangements further include a band-pass filter.

7 Claims, 5 Drawing Sheets

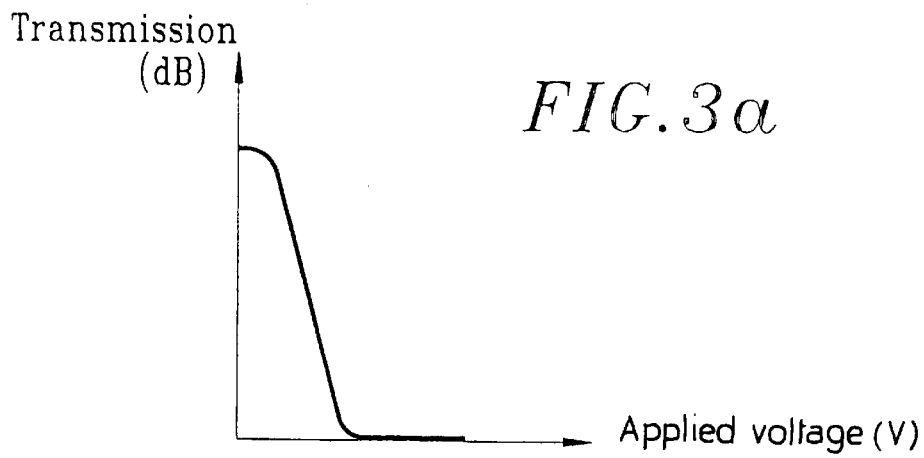
FIG. 3a
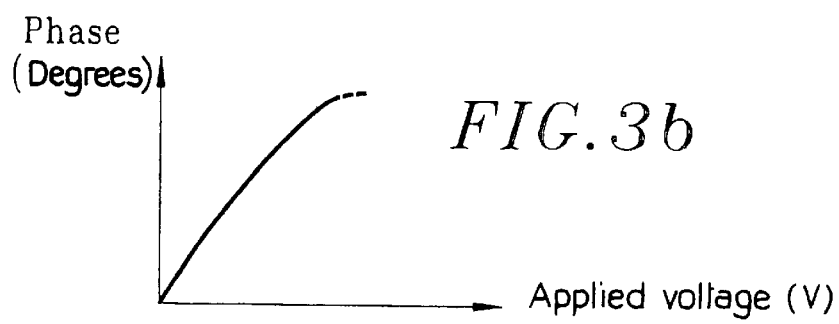
FIG. 3b
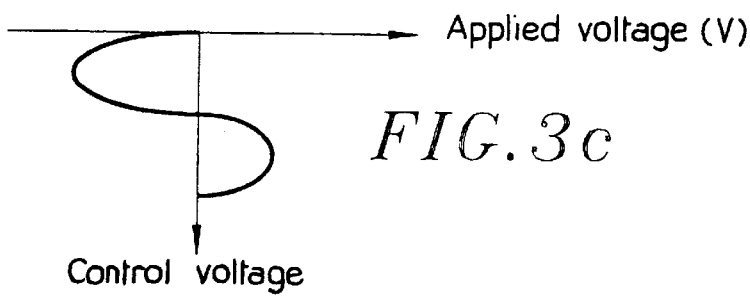
FIG. 3c
FIG. 4a
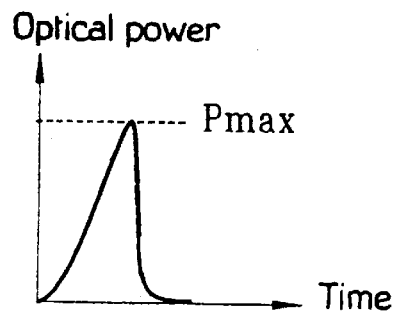
FIG. 4b
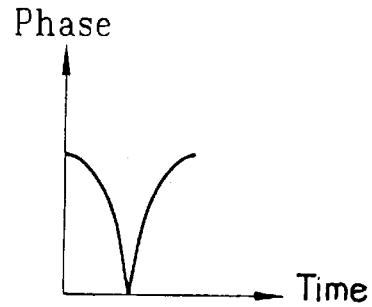

SYSTEM FOR TRANSMITTING RZ PULSES OVER AN AMPLIFIED OPTICAL LINE, IN PARTICULAR OVER LONG DISTANCES

BACKGROUND OF THE INVENTION

1. Field of the Invention

The present invention concerns a system for long distance transmission of RZ (return to zero) type optical pulses of the kind that use in-line optical amplification.

2. Description of the Prior Art

In a very long distance transmission system using in-line optical amplification, one of the main factors limiting the bit rate is propagation distortion caused by the transmission fiber. This limitation is due to the co-existence of two phenomena in monomode optical fibers, chromatic dispersion and non-linear effects.

For a detailed analysis of the main characteristics of these two effects, reference may usefully be had to the following work:

[1] G. P. Agrawal, "Nonlinear fiber optics", Academic Press, San Diego, 1989.

Chromatic dispersion is the result of the frequency dependency of the index of the fiber, and results in different propagation times at different wavelengths. Generally, the effect of chromatic dispersion is to broaden the pulses of digital bit streams.

The most important non-linear effect in a transmission fiber at the optical power levels (a few milliwatts) used in the first long-distance amplified transmission systems is the Kerr effect. It is the result of a linear dependency of the index of the silica on the optical power. At high operating powers (in the order of 1 W and above) it broadens the optical spectrum.

In the case where the chromatic dispersion is of the "abnormal" type (where a pulse with a given wavelength is delayed relative to pulses at lower wavelengths), chromatic dispersion and the Kerr effect have opposite effects on the pulses transmitted. In the general case, this leads to phenomena known as "modulation instability": the pulses "burst" into very short pulses after 1 000 km to 2 000 km and the optical spectrum is considerably broadened.

In the case where the chromatic dispersion is of the "normal" type (where a pulse at a given wavelength is delayed relative to pulses at higher wavelengths), there is no modulation instability but the spectrum broadens in a monotonic manner during propagation and the pulses are considerably widened temporally, which causes intersymbol interference.

Very long distance (6 000 km to 9 000 km) submarine transmission systems operating at 5 Gbit/s have already been installed. These systems use an NRZ modulation format and dispersion-shifted fibers which have zero mean chromatic dispersion at around 1.55 µm.

Higher bit rates (10 Gbit/s and above) are being considered for soliton transmission systems, the subject of a great deal of research at the present time. Solitons are RZ pulses which are precisely defined in terms of their temporal and spectral shape and their peak power and for which the Kerr effect and chromatic dispersion cancel each other out; this occurs in abnormal type chromatic dispersion propagation fibers. Accordingly, soliton pulses have the property of propagating without changing shape.

Soliton optical transmission has the major drawback of requiring a relatively constant line power level, however, the power band within which the soliton effect is obtained being very narrow (3 dBm to 4 dBm).

Moreover, soliton transmission over transoceanic distances cannot be effected at high bit rates without a minimum of in-line control, either by filtering or by intensity or phase modulation.

Control by filtering necessitates relatively narrow filters.

Control by modulation, which entails in-line optical remodulation of the solitons, can destabilize the frequency of the pulses.

The invention proposes an RZ type optical pulse transmission system of a new type that overcomes theses drawbacks.

SUMMARY OF THE INVENTION

Specifically, in the transmission system proposed by the invention the mean chromatic dispersion of the fiber of the line is of the normal type and the reshaping means include a modulator that is synchronized to the pulse stream that it receives and that applies amplitude modulation to reshape the pulses temporally and phase modulation that is decreasing at the start of a pulse and increasing at the end of a pulse to reshape the pulses spectrally.

It preferably also includes a band-pass filter that stabilizes the pulse amplitude.

Abnormal type chromatic dispersion compensation fibers are advantageously distributed along the length of the line.

Other features and advantages will emerge from the following description.

This description is purely illustrative and non-limiting. It must be read in conjunction with the appended drawings.

BRIEF DESCRIPTION OF THE DRAWINGS

FIGS. 3a and 3b show transmission and phase characteristic curves as a function of the control voltage of the modulator of the FIG. 1 transmission system, FIG. 3c showing the control voltage applied to that modulator as a function of time.

FIGS. 4a and 4b show the power and phase transfer functions of that modulator.

DETAILED DESCRIPTION OF THE PREFERRED EMBODIMENT

Figure 1:
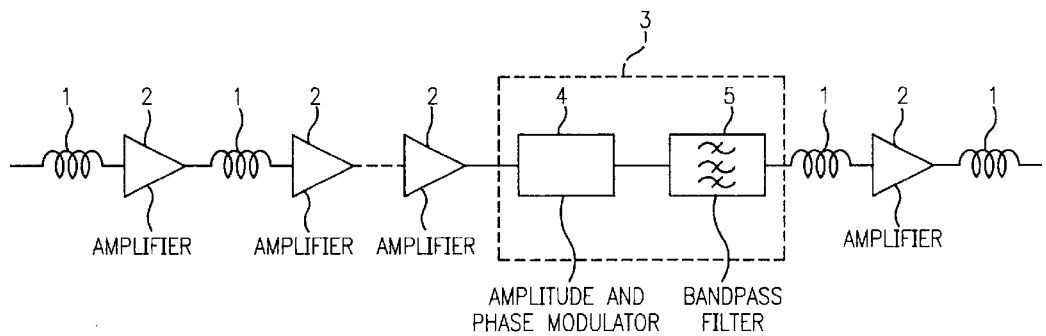
FIG. 1 is a schematic showing one embodiment of the transmission system proposed by the invention.

The transmission system shown in FIG. 1 includes in line a propagation fiber 1 with normal type dispersion, amplifiers 2 regularly distributed along the length of the line and means 3 for reshaping the pulses temporally and spectrally.

The reshaping means 3 include an amplitude and phase modulator 4 and a band-pass filter 5.

The modulator 4 is controlled by a clock signal recovered from the optical signal propagating in the fiber 1.

Figure 2A:
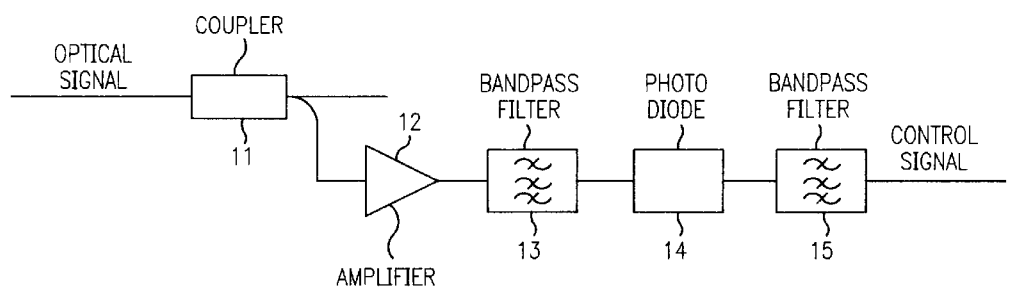
FIGS. 2a and 2b show two embodiments of means for recovering a clock signal from the optical signal propagating in the FIG. 1 system.

FIG. 2a shows one embodiment of the clock signal recovery means. In this figure, the recovery means include an optical amplifier 12 to which a coupler 11 diverts a portion of the optical signal propagating in the fiber, a band-pass filter 13, a photodiode 14 and an electrical band-pass filter 15 connected to the output of the photodiode 14 and centered on the frequency corresponding to the bit rate in the fiber.

Figure 2B:
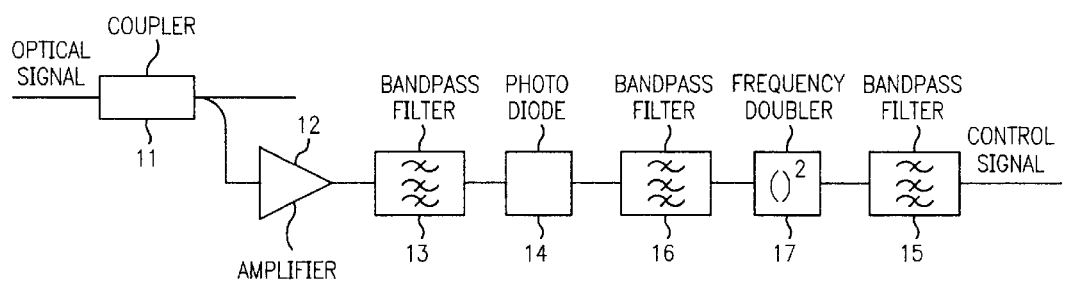

As an alternative to this, as shown in FIG. 2b, an electrical band-pass filter 16 corresponding to 0.7 times the bit rate in the fiber, in series with a frequency doubler 17 may be inserted between the filter 15 and the photodiode 14.

The modulator 4 is an electro-absorbent (or lithium niobate) modulator, for example.

Its characteristics are shown in FIGS. 3a through 3c.

As shown in FIGS. 3a and 3b, the curve of the transmission of the modulator 4 as a function of its control voltage is a falling curve and the curve of the lagging phase-shift that the modulator 4 imposes on the optical beams passing through it as a function of the control voltage is a rising curve.

As shown in FIG. 3c, the control voltage input to the modulator 4 is a sinusoidal voltage the minimal voltage of which is the zero voltage.

With a control voltage of this kind, the modulator 4 modulates the optical power of the pulses that it receives as shown by the graph in FIG. 4a, attenuating more strongly the beginning and the end of the pulses and passing their middle part. This reshapes the pulses temporally.

At the same time, as shown by the FIG. 4b graph, the modulator 4 introduces a lagging phase-shift which is decreasing at the start of the pulse and increasing at the end. As will be understood from reference to FIGS. 5a, 5b and 6a, 6b, the effect of this phase modulation is to compress the spectrum broadened by the Kerr effect.

Figure 5A:
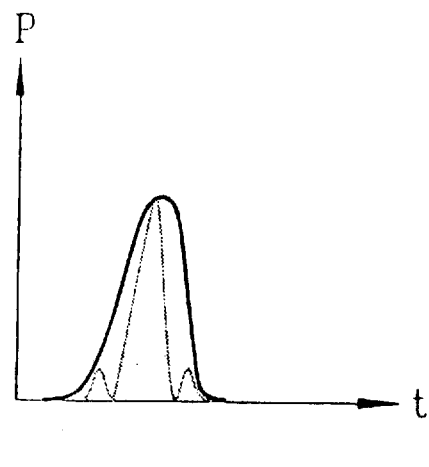
FIGS. 5a and 5b are temporal and spectral graphs of the same pulse at the input to the FIG. 1 transmission system.
Figure 5B:
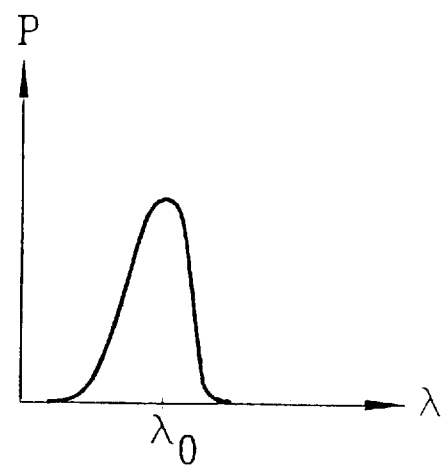

FIGS. 5a and 5b give the characteristic shapes of the curves for power as a function of time and power as a function of wavelength for an optical pulse at the input of the transmission system of the invention, FIG. 5a showing the carrier of the signal. In this example it is assumed that the pulses at the input to the system are not subject to any phase variation.

Figure 6A:
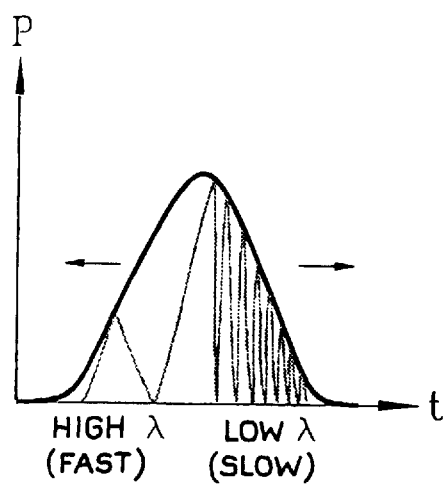
FIGS. 6a and 6b are graphs analogous to those of FIGS. 5a and 5b for the same pulse after propagation along the line and before reshaping.
Figure 6B:
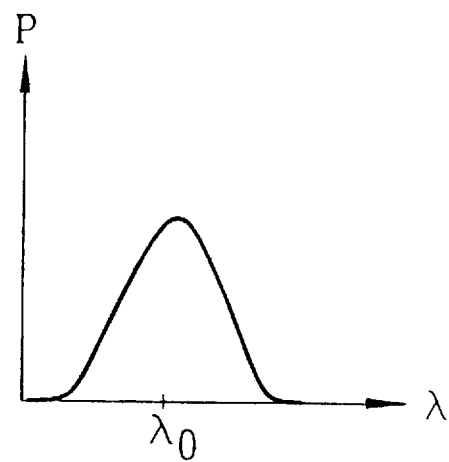

As can be seen from FIGS. 6a and 6b, the pulse is temporally and spectrally broadened as it propagates in the line fiber 1, the pulse start being broadened towards high wavelength values and the pulse end being broadened towards low wavelength values.

The phase modulation applied by the modulator 4 compensates this spectral distortion. It operates on the start of the pulse and on the end of the pulse to bring the high and low wavelength values and the start and the end of the pulse back to the central wavelength of the middle of the pulse.

The band-pass filter 5 stabilizes the action of the amplitude modulation by limiting amplitude fluctuations of the pulses.

It is implemented using interference layers or the Fabry-Perot principle, for example. Its pass-band depends on the number of times the filtering is applied and the spectral narrowness of the pulses transmitted.

Figure 7A:
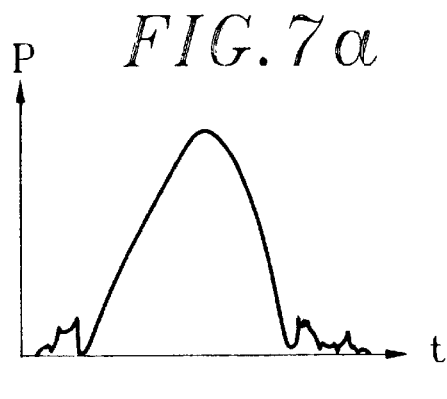
FIGS. 7a and 7b are temporal and spectral graphs showing the optical signal at the input to the reshaping means of the FIG. 1 system.
Figure 7B:
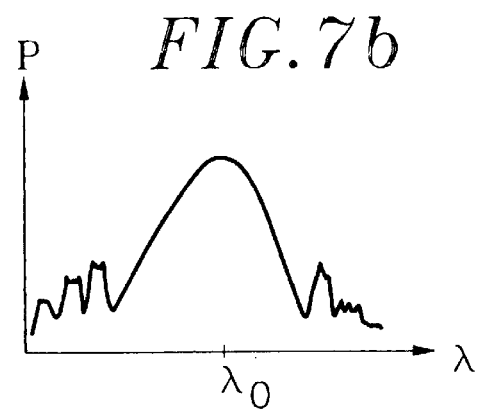

FIGS. 7a and 7b are temporal and spectral representations of an optical signal arriving at the reshaping means 3.

This signal represents a pulse that has been deformed as a consequence of its propagation and that is also affected by noise.

Figure 8A:
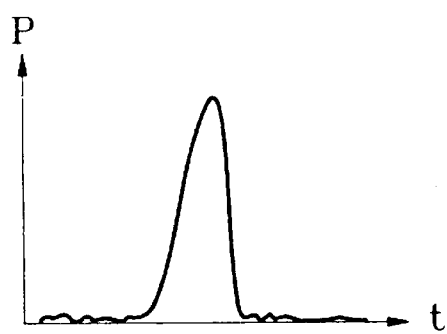
FIGS. 8a and 8b are temporal and spectral graphs showing the optical signal and the output of the reshaping means, before filtering.
Figure 8B:
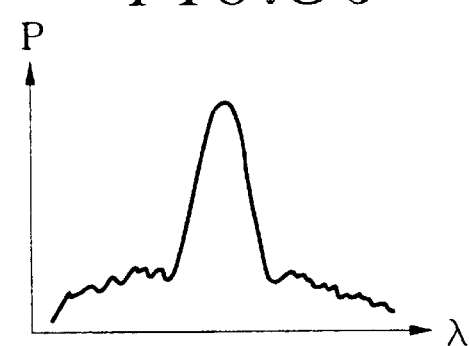

After processing by the modulator 4, the signal corresponds to a temporally and spectrally compressed pulse affected by noise (FIGS. 8a and 8b).

Figure 9A:
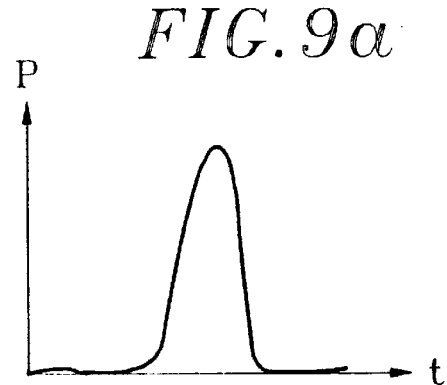
FIGS. 9a and 9b are temporal and spectral graphs showing the same signal after filtering.
Figure 9B:
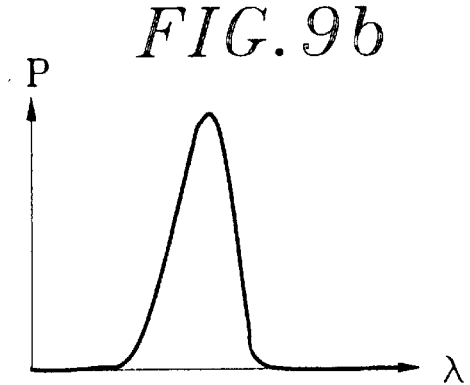

The noise is removed by the filter 5 (FIGS. 9a, 9b).

Accordingly, with the width of the filter and the depth of amplitude and phase modulation chosen correctly, the pulses are regenerated and in particular narrowed both temporally and spectrally. This reshaping compensates the distortion and penalties associated with propagation in the line fiber and the noise introduced by optical amplifiers present in the line.

In accordance with one particularly advantageous complementary feature, abnormal type chromatic dispersion compensating fibers are regularly distributed along the line.

These fibers eliminate or strongly attenuate the peaks that correspond to spurious pulses that appear during propagation. They compress high amplitude pulses more than low amplitude pulses, so introducing the effect of differential gain between the pulses that correspond to the binary signal and the spurious pulses.

The various reshaping means just described are disposed regularly along the system.

Note that if the pulses at the input of the line do not correspond exactly to the equilibrium state, they are caused to converge towards that state after propagating a certain distance along the line.

For transmission over a distance in the order of 9 000 km, for example, the distance between the amplifiers 2 is 40 km. The filters 5 and the modulators 4 are advantageously disposed approximately every 200 km.

The optical fiber 1 transmits the wavelength of 1.55 $\mu$m and is a dispersion-shifted fiber in which the chromatic dispersion is of the normal type on average at the operating wavelength and the absolute value of which is advantageously in the order of 0.2 ps/nm/km to 0.4 ps/nm/km.

It has an effective cross-section of 50 $\mu$m$^2$ and a Kerr non-linearity constant of $3 \times 10^{-20}$ m$^2$/W.

Its attenuation coefficient is 0.2 dB/km.

The amplifiers 2 are erbium-doped fibers which amplify wavelength between 1 528 nm and 1 570 nm. Their gain is 8 dB. Their noise excess factor is 3 dB.

A system of this kind enables good quality transmission of a 10 Gbit/s stream of modulated RZ pulses with a pulse width at mid-height of 18 ps.

Note that without regeneration means the performance of a transmission system of this kind is very poor after approximately 1 000 km.

Figure 10:
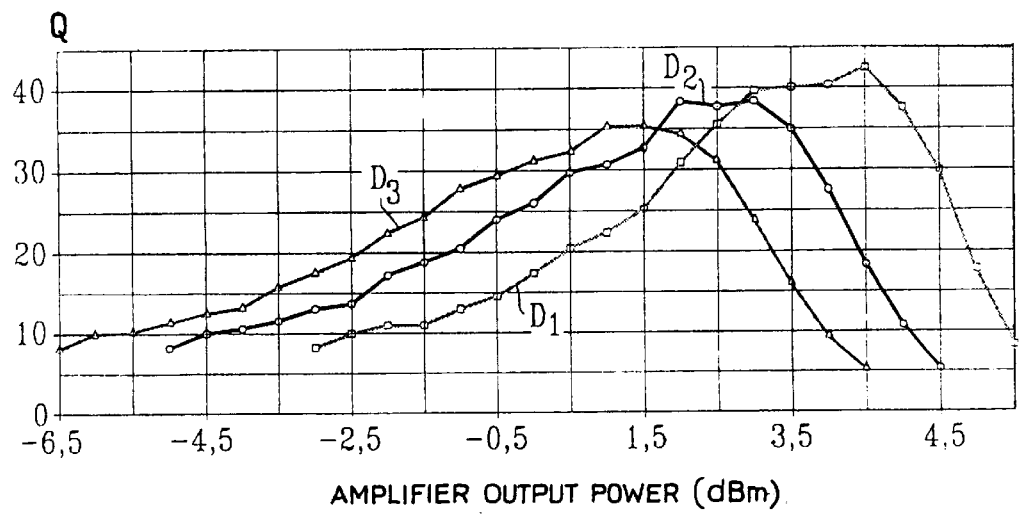
FIG. 10 is a graph with several curves showing the Q (quality factor) of the transmission system as a function of the output power of its amplifiers (in dBm), the various curves corresponding to different in-line chromatic dispersions.

FIG. 10 shows various curves of the Q (quality factor) as a function of the output power of the amplifiers 2, in the case where the fiber 1 has a mean chromatic dispersion of the normal type with an absolute value of 0.2 ps/nm/km (curve D1), 0.3 ps/nm/km (curve D2) or 0.4 ps/nm/km (curve D3).

The Q of a line is defined by the equation:

$$Q = m(1) - m(0)/(\sigma(1) + \sigma(0))$$

where:

m(1) and m(0) are the respective means of the 1 and 0 levels received,

σ(1) and σ(0) are the respective standard deviations of the 1 and 0 levels received.

As the curves show, the Q of the line is greater than 10 for a wide range of output powers of the output of the amplifiers 2, for the three values of chromatic dispersion of the three curves D1, D2 and D3.

For these three values of dispersion, the system proposed by the invention provides good transmission quality for amplifier power variations in the order of 9 dBm, whereas soliton transmission systems tolerate amplification variations of only between 3 dBm and 4 dBm for comparable inter-amplifier distances.

Figure 11:
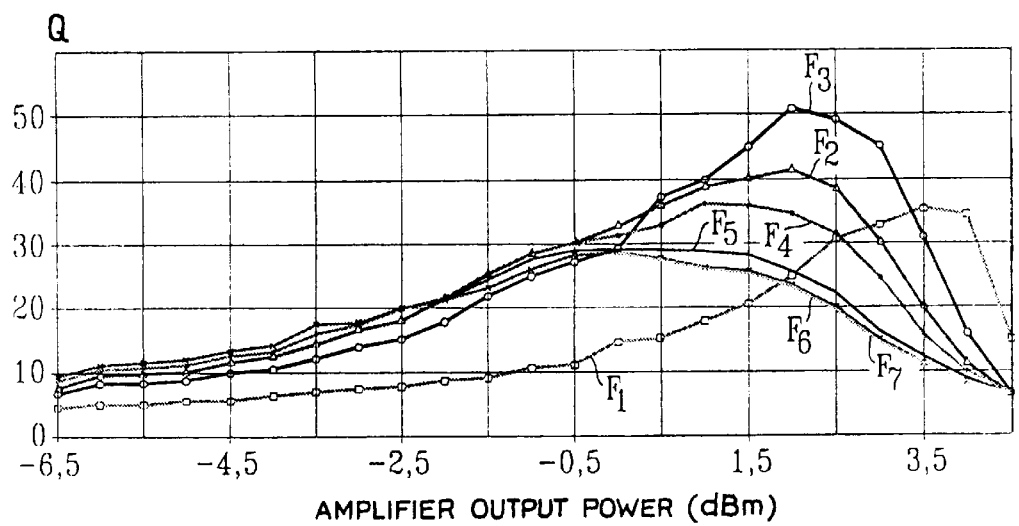
FIG. 11 is a curve showing the quality factor/amplifier output power curves for a given in-line chromatic dispersion and different widths of the filter.

Refer now to FIG. 11 showing curves of the Q as a function of the output power of the amplifiers 2 for filters 5 having different spectral bandwidths, in the case of a transmission fiber with an abnormal type chromatic dispersion having a mean absolute value of 0.4 ps/nm/km.

The curves F1 through F4 respectively correspond to bandwidths of 0.2 nm, 0.3 nm, 0.4 nm and 0.5 nm. The curves F5 through F7 respectively correspond to bandwidths of 1 nm, 2 nm and 5 nm.

This figure shows that the filter width tolerances of the system proposed by the invention are particularly high, the Q being greater than 10 in all cases over a wide range of amplifier powers.

Consequently, it will have been understood from reading this description that the system proposed by the invention enables high bit rates to be obtained with the advantage of power margins and chromatic dispersion and filter width tolerances that are much greater than in soliton transmission systems.

A system of this kind can be used for single-channel transmission or for other applications, for example multiplexed applications using channel multiplexing by polarization.

There is claimed:

1. A system for transmitting a return to zero type optical pulse stream having a plurality of pulses. said system comprising:

an optical line having a line fiber with a mean chromatic dispersion of a normal type and a length;

means for amplifying distributed along said line; and means for reshaping pulses distributed along said line, said reshaping means having a modulator that is synchronized to said pulse stream, said modulator receiving said pulse stream and applying an amplitude modulation to reshape said pulses temporally and a phase modulation that decreases at a start of each of said pulses and increases at an end of each of said pulses to reshape said pulses spectrally.

2. A system as claimed in claim 1 including a band-pass filter that stabilizes the pulse amplitude.

3. The system claimed in claim 1 wherein abnormal type chromatic dispersion compensation fibers are distributed along the length of the line.

4. The system claimed in claim 1 wherein the line fiber is a dispersion-shifted fiber the mean chromatic dispersion of which is of the normal type and has an absolute value in the order of 0.2 ps/nm/km to 0.4 ps/nm/km.

5. The system claimed in claim 1 wherein the reshaping means are distributed along the length of the line approximately every 200 km.

6. The system claimed in claim 1 wherein the transmission wavelength of the line fiber is 1.55 µm.

7. The system as claimed in claims 1, 2, 3, 4, 5 or 6, said system transmitting in one of a single-channel and a multiplexed long distance transmission.

* * * * *